United States Patent
Zhao

(10) Patent No.: US 10,587,462 B2
(45) Date of Patent: Mar. 10, 2020

(54) METHOD AND APPARATUS FOR DEPLOYING VIRTUAL OPERATION, ADMINISTRATION AND MAINTENANCE, AND VIRTUALIZED NETWORK SYSTEM

(71) Applicant: Huawei Technologies Co., Ltd., Shenzhen (CN)

(72) Inventor: Dong Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 201 days.

(21) Appl. No.: 15/416,339

(22) Filed: Jan. 26, 2017

(65) Prior Publication Data
US 2017/0134218 A1    May 11, 2017

Related U.S. Application Data

(63) Continuation of application No. PCT/CN2014/083623, filed on Aug. 4, 2014.

(51) Int. Cl.
*G06F 8/61* (2018.01)
*H04L 12/24* (2006.01)
*H04L 12/46* (2006.01)

(52) U.S. Cl.
CPC ............ *H04L 41/0803* (2013.01); *G06F 8/61* (2013.01); *H04L 12/4641* (2013.01); *H04L 41/00* (2013.01); *H04L 41/0816* (2013.01); *H04L 41/18* (2013.01)

(58) Field of Classification Search
CPC ..... G06F 8/61; G06F 3/0486; H04L 41/0816; H04L 45/586; H04L 12/66; H04L 12/4641; H04L 41/0803; H04L 41/18; H04L 41/00
See application file for complete search history.

(56) References Cited

U.S. PATENT DOCUMENTS

| 9,036,504 | B1* | 5/2015 | Miller ................. H04L 41/0816 370/254 |
| 2008/0240122 | A1* | 10/2008 | Richardson ............. H04L 12/66 370/401 |
| 2013/0232463 | A1* | 9/2013 | Nagaraja ................... G06F 8/61 717/101 |
| 2014/0201374 | A1 | 7/2014 | Ashwood-Smith et al. | |

FOREIGN PATENT DOCUMENTS

| CN | 101764703 A | 6/2010 |
| CN | 102523117 A | 6/2012 |
| CN | 103051710 A | 4/2013 |
| CN | 103607308 A | 2/2014 |

OTHER PUBLICATIONS

"Network Function Virtualization (NFV) Management and Orchestration," GS NFV-MAN 001, V0.6.1, Group Specification, Jul. 2015, 196 pages.

* cited by examiner

*Primary Examiner* — Kyung H Shin
(74) *Attorney, Agent, or Firm* — Slater Matsil, LLP

(57) ABSTRACT

A method for deploying virtual operation, administration and maintenance includes obtaining customized information of virtual operation, administration and maintenance (V-OAM) that needs to be deployed, where the customized information defines an attribute of the V-OAM, and deploying, on a virtualized network according to the customized information, the V-OAM that is capable of managing at least one type of VNF network element. The V-OAM is deployed on the virtualized network.

20 Claims, 7 Drawing Sheets

METHOD AND APPARATUS FOR DEPLOYING VIRTUAL OPERATION, ADMINISTRATION AND MAINTENANCE, AND VIRTUALIZED NETWORK SYSTEM

CROSS-REFERENCE TO RELATED APPLICATIONS

This application is a continuation of International Application No. PCT/CN2014/083623, filed on Aug. 4, 2014, the disclosure of which is hereby incorporated by reference in its entirety.

TECHNICAL FIELD

The present invention relates to the field of network technologies, and in particular, to a method and an apparatus for deploying virtual operation, administration and maintenance, and a virtualized network system.

BACKGROUND

Network functions virtualization (NFV) aims to implement functions of private physical network element devices of a wireless communications network by using storage and switching devices and an x86 server that are based on an information technology (IT) industry standard. On one hand, an IT device based on an x86 standard is cost-effective, so that substantial investment costs can be reduced for an operator. On the other hand, an open application programming interface (API) can help the operator obtain more flexible network capabilities.

FIG. 1 shows a basic architecture of a virtualized network in the prior art. As shown in FIG. 1, the virtualized network mainly includes the following network elements: an network functions virtualization orchestrator (NFVO), a virtualized network function (VNF), a VNF manager (VNFM), and a virtualized infrastructure manager (VIM).

The NFVO is responsible for overall orchestration of virtualized network deployment (that is, network virtualization organization) and for allocation and reservation of a corresponding virtual resource.

The VNF is a main entity for network virtualization. The VNF virtualizes, by using a virtual resource provided by an network functions virtualization infrastructure (NFVI), various types of network elements of a network that the operator needs to virtualize and deploy. The VNFM virtualizes a corresponding function of the VNF according to a VNF catalog requirement, and establishes a basic connection and even a signaling channel and a service channel.

The VNFM is responsible for virtualization of a specific VNF (virtualization is performed according to a VNF catalog, and different VNF catalogs are controlled by using different VNFMs).

The VIM is configured to manage the NFVI and provide a virtual resource for virtualization of the VNF.

The NFVO is connected to an network management system/operation support system/business support system, operation and management system (NMS/OSS/BSS) by using an Os-Nfvo interface, is connected to the VNFM by using an Nfvo-Vnfm interface, and is connected to the VIM by using an Nfvo-Vi interface. The VNFM is connected to the VIM by using a vnfm-Vi interface, and is connected to the VNF by using a VeNf-Vnfm interface. The VNF is connected to the NFVI by using a Vn-Nf interface. The VIM is connected to the NFVI by using Nf-Vi interface.

The virtualized network shown in FIG. 1 is based on a virtualized system (for example, a cloud system), and the NFVO organizes and orchestrates different virtualized network element VNFs (virtualized network function) to implement virtualization deployment of different types of networks and implement an existing wireless communications system that requires different network hardware to be deployed in different locations according to different functions to implement different network services. In addition, because function network element deployment can be implemented on the basis of various types of general-purpose servers by using a software cloud deployment method, without restriction from man power and a hardware type, cost-effective, dynamic, and rapid network deployment can be implemented, and in a running process, performance and a type of a current deployed network can be changed at any time according to different network performance requirements and according to a requirement on different types of networks, so as to provide a flexible service capability for the operator more effectively.

However, on the virtualized network shown in FIG. 1, the NMS/OSS/BSS serves as an operation-level management system and is incapable of managing different types of VNF network elements (for example, network elements provided by different manufacturers), and on the virtualized network, there is no management system that is capable of managing various types of VNF network elements.

SUMMARY

Embodiments of the present invention provide a method and an apparatus for deploying virtual operation, administration and maintenance, and a virtualized network system, so as to implement deployment of virtual operation, administration and maintenance on a virtualized network, and manage various types of VNF network elements by means of the virtual operation, administration and maintenance.

A first aspect of the present invention provides a method for deploying virtual operation, administration and maintenance, where the method includes obtaining customized information of virtual operation, administration and maintenance (V-OAM) that needs to be deployed, where the customized information is used for defining an attribute of the V-OAM, and deploying, on a virtualized network according to the customized information, the V-OAM that is capable of managing at least one type of virtualized network function VNF network element.

In a first possible implementation manner of the first aspect, the obtaining customized information of virtual operation, administration and maintenance that needs to be deployed includes reading a virtualized network function catalog VNF catalog or a virtual operation, administration and maintenance catalog V-OAM catalog, to obtain the customized information, where the virtualized network function catalog VNF catalog or the virtual operation, administration and maintenance catalog V-OAM catalog is stored in a network functions virtualization orchestrator NFVO, or receiving the customized information specified by an operation and management system.

In a second possible implementation manner of the first aspect, the customized information includes at least one of the following information network management function configuration information, interface definition information, connection definition information, resource requirement definition information, virtualization manner information, or type information of the V-OAM.

With reference to the first aspect, or the first or the second possible implementation manner of the first aspect, in a third possible implementation manner, before the deploying, on a virtualized network according to the customized information, the V-OAM that is capable of managing at least one type of VNF network element, the method further includes obtaining attribute information of at least one type of VNF network element that needs to be deployed. The deploying, on a virtualized network according to the customized information, the V-OAM that is capable of managing at least one type of VNF network element includes deploying, on the virtualized network according to the attribute information and the customized information, the V-OAM that is capable of managing the at least one type of VNF network element that needs to be deployed.

With reference to the first aspect, or the first or the second possible implementation manner of the first aspect, in a fourth possible implementation manner, before the obtaining customized information of virtual operation, administration and maintenance V-OAM that needs to be deployed, the method further includes determining whether a preset trigger condition is met, and if the preset trigger condition is met, triggering deployment of the V-OAM, where the trigger condition includes: a quantity of VNF network elements that have been deployed on the virtualized network is greater than a pre-determined value, or a VNF network element with a self-organizing function has been deployed on the virtualized network.

With reference to the first aspect, or the first or the second possible implementation manner of the first aspect, in a fifth possible implementation manner, before the obtaining customized information of virtual operation, administration and maintenance V-OAM that needs to be deployed, the method further includes receiving an instruction that is sent by the NFVO or the operation and management system and that is used for starting deployment of the V-OAM.

With reference to the first aspect, or the first or the second possible implementation manner of the first aspect, in a sixth possible implementation manner of the first aspect, the method further includes managing a life cycle of the V-OAM according to the customized information.

A second aspect of the present invention provides an apparatus for deploying virtual operation, administration and maintenance, where the apparatus includes an obtaining unit, configured to obtain customized information of virtual operation, administration and maintenance V-OAM that needs to be deployed, where the customized information is used for defining an attribute of the V-OAM, and a deployment unit, configured to deploy, on a virtualized network according to the customized information, the V-OAM that is capable of managing at least one type of virtualized network function VNF network element.

In a first possible implementation manner of the second aspect, the obtaining unit is specifically configured to read a virtualized network function catalog VNF catalog or a virtual operation, administration and maintenance catalog V-OAM catalog, to obtain the customized information, where the virtualized network function catalog VNF catalog or the virtual operation, administration and maintenance catalog V-OAM catalog is stored in a network functions virtualization orchestrator NFVO; or specifically configured to receive the customized information specified by an operation and management system.

In a second possible implementation manner of the second aspect, the customized information includes at least one of the following information network management function configuration information, interface definition information, connection definition information, resource requirement definition information, virtualization manner information, or type information of the V-OAM.

With reference to the second aspect, or the first or the second possible implementation manner of the second aspect, in a third possible implementation manner, the obtaining unit is further configured to obtain attribute information of at least one type of VNF network element that needs to be deployed, and the deployment unit is specifically configured to deploy, on the virtualized network according to the attribute information and the customized information, the V-OAM that is capable of managing the at least one type of VNF network element that needs to be deployed.

With reference to the second aspect, or the first or the second possible implementation manner of the second aspect, in a fourth possible implementation manner, the apparatus further includes a determining unit, configured to determine whether a preset trigger condition is met, and a triggering unit, configured to trigger deployment of the V-OAM when a determining result of the determining unit is that the trigger condition is met, where the trigger condition includes: a quantity of VNF network elements that have been deployed on the virtualized network is greater than a pre-determined value, or a VNF network element with a self-organizing function has been deployed on the virtualized network.

With reference to the second aspect, or the first or the second possible implementation manner of the second aspect, in a fifth possible implementation manner, the apparatus further includes a receiving unit, configured to receive an instruction that is sent by the NFVO or the operation and management system and that is used for starting deployment of the V-OAM.

With reference to the second aspect, or the first or the second possible implementation manner of the second aspect, in a sixth possible implementation manner of the second aspect, the apparatus further includes a management unit, configured to manage a life cycle of the V-OAM according to the customized information.

A third aspect of the present invention provides a virtualized network system, including a network functions virtualization orchestrator NFVO, where the NFVO is configured to: obtain customized information of virtual operation, administration and maintenance V-OAM that needs to be deployed, where the customized information is used for defining an attribute of the V-OAM; and deploy, on a virtualized network according to the customized information, the V-OAM that is capable of managing at least one type of VNF network element.

A fourth aspect of the present invention provides a virtualized network system, including a virtualized network function manager VNFM, where the VNFM is configured to: obtain customized information of virtual operation, administration and maintenance V-OAM that needs to be deployed, where the customized information is used for defining an attribute of the V-OAM; and deploy, on a virtualized network according to the customized information, the V-OAM that is capable of managing at least one type of VNF network element.

A fifth aspect of the present invention provides a virtualized network system, including: a network functions virtualization orchestrator NFVO, a virtualized network function manager VNFM, and a virtual operation, administration and maintenance manager V-OAM manager. The V-OAM manager is configured to obtain customized information of virtual operation, administration and maintenance V-OAM that needs to be deployed, where the customized information is used for defining an attribute of the V-OAM, and deploy, on a virtualized network according to the customized information, the V-OAM that is capable of managing at least one type of VNF network element.

A sixth aspect of the present invention provides an apparatus for deploying virtual operation, administration and maintenance, including a memory and a processor that are connected to a bus. The memory is configured to store an execution instruction, and the processor is configured to communicate with the memory, and execute the execution instruction to enable the apparatus to execute the following method. The method includes obtaining customized information of virtual operation, administration and maintenance V-OAM that needs to be deployed, where the customized information is used for defining an attribute of the V-OAM, and deploying, on a virtualized network according to the customized information, the V-OAM that is capable of managing at least one type of VNF network element.

According to the method and apparatus for deploying virtual operation, administration and maintenance, and the virtualized network system provided in the present invention, virtual operation, administration and maintenance can be deployed on a virtualized network according to customized information, and various types of VNF network elements can be managed by means of the virtual operation, administration and maintenance, thereby overcoming a disadvantage in the prior art and achieving the following advantages: The virtual operation, administration and maintenance is capable of effectively taking advantage of a virtualized network, and is capable of considering backward compatibility of virtual network management with conventional network management; the virtual operation, administration and maintenance is capable of managing a dynamic virtualized network function (VNF) with minimum resource occupancy and least function support or interface support; and the virtual operation, administration and maintenance is capable of dynamically adjusting a virtualization scale, type, and interface of the virtual operation, administration and maintenance according to a virtualization process and status of the VNF, so as to implement real virtualization management.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
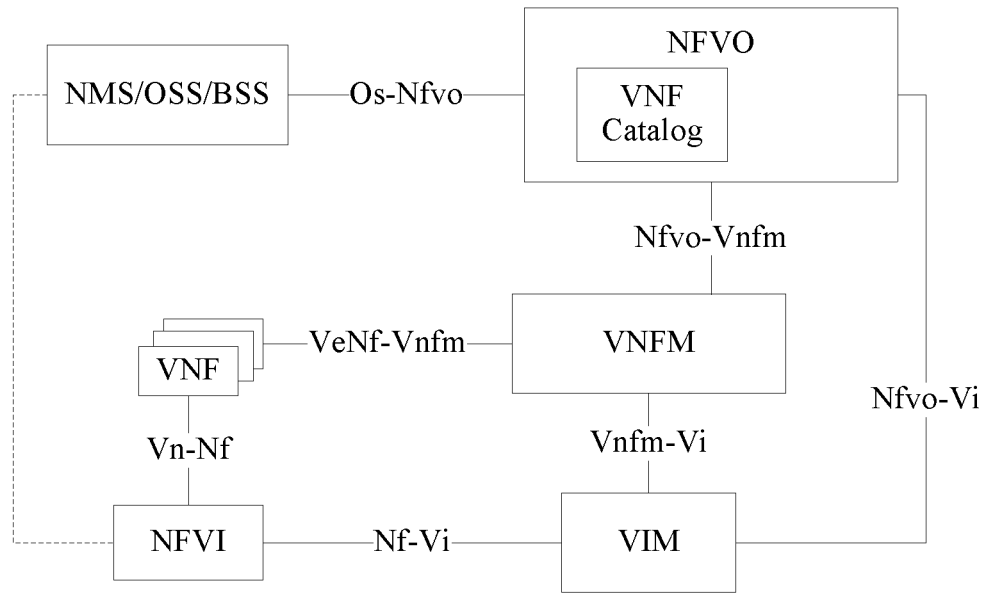
FIG. 1 is a schematic architectural diagram of a virtualized network.
Figure 2:
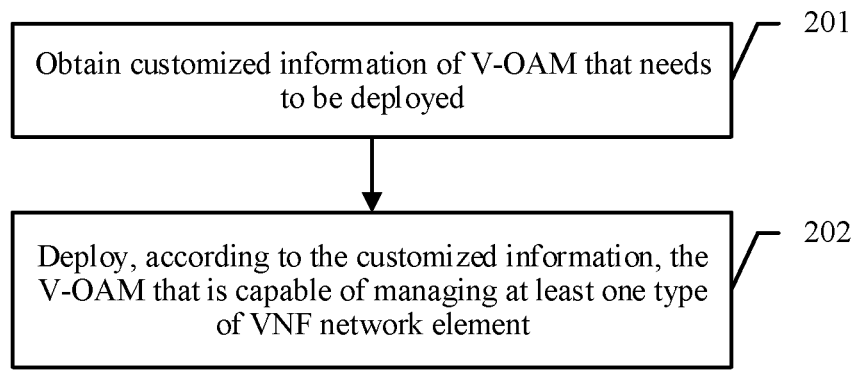
FIG. 2 is a schematic flowchart of a method for deploying virtual operation, administration and maintenance according to Embodiment 1 of the present invention.

Referring to FIG. 2, FIG. 2 is a schematic flowchart of a method for deploying virtual operation, administration and maintenance according to Embodiment 1 of the present invention. As shown in FIG. 2, the method may include the following steps.

201. Obtain customized information of V-OAM (virtual operation, administration and maintenance) that needs to be deployed.

The customized information may be used for defining an attribute of the virtual operation, administration and maintenance that needs to be deployed. Specific content of the customized information may be set by a user (for example, an operation and management system) according to a virtualization requirement for the virtual operation, administration and maintenance. For example, the customized information may include at least one of the following information: network management function configuration information, interface definition information, connection definition information, resource requirement definition information, virtualization manner information, or type information of the V-OAM.

202. Deploy, on a virtualized network according to the customized information, the V-OAM that is capable of managing at least one type of VNF network element. The method provided in this embodiment may be executed by an NFVO, a VNFM, or V-OAM manager.

In the method for deploying virtual operation, administration and maintenance provided in this embodiment, V-OAM is deployed on a virtualized network, so that different types of VNF network elements can be managed by means of the V-OAM, thereby overcoming a disadvantage in the prior art and achieving the following advantages. The virtual operation, administration and maintenance is capable of effectively taking advantage of a virtualized network, and is capable of considering backward compatibility of virtual network management with conventional network management; the virtual operation, administration and maintenance is capable of managing a dynamic virtualized network function (VNF) with minimum resource occupancy and least function support or interface support; and the virtual operation, administration and maintenance is capable of dynamically adjusting a virtualization scale, type, and interface of the virtual operation, administration and maintenance according to a virtualization process and status of the VNF, so as to implement real virtualization management.

Embodiment 2

Figure 3A:
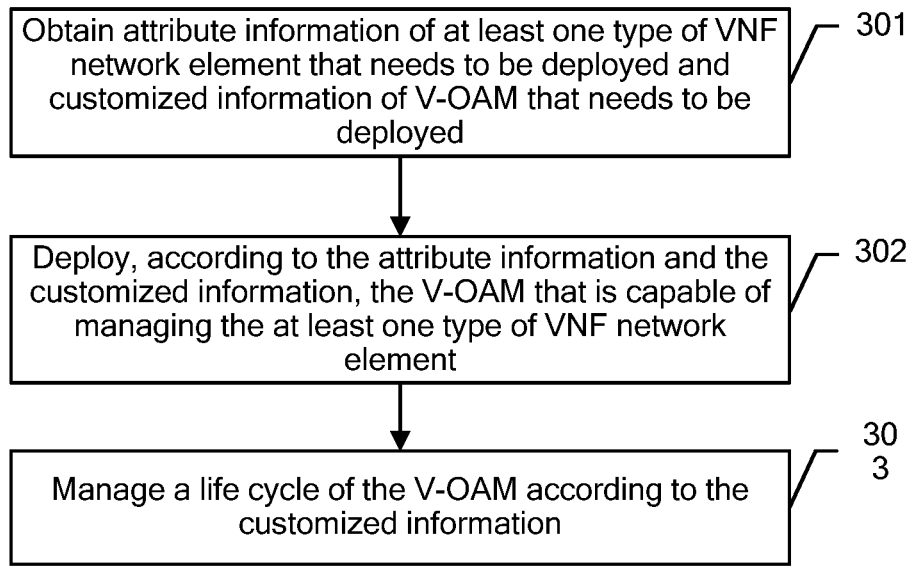
FIG. 3A is a first schematic flowchart of a method for deploying virtual operation, administration and maintenance according to Embodiment 2 of the present invention.
Figure 3B:
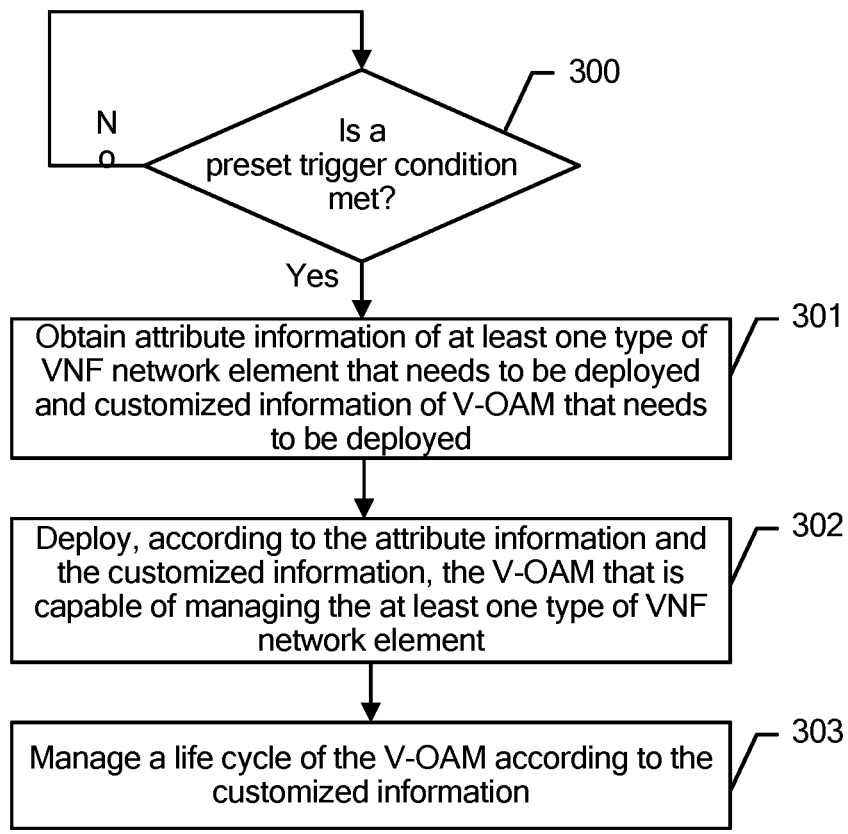
FIG. 3B is a second schematic flowchart of a method for deploying virtual operation, administration and maintenance according to Embodiment 2 of the present invention.

Referring to FIG. 3A and FIG. 3B, FIG. 3A and FIG. 3B are schematic flowcharts of a method for deploying virtual operation, administration and maintenance according to Embodiment 2 of the present invention. As shown in FIG. 3A, the method may include the following steps.

301. Obtain attribute information of at least one type of VNF network element that needs to be deployed and customized information of V-OAM that needs to be deployed.

The method in this embodiment may be executed by an NFVO or a VNFM.

The VNF network element that needs to be deployed may be one or more VNF network elements. The attribute information of the VNF network element may be preset by a user (for example, an operation and management system), and may be stored in a VNF catalog.

The attribute information of the VNF network element may include attribute information such as a type, an interface, and a function of the VNF network element.

The type of the VNF network element mainly refers to a network element type to which the VNF belongs, such as an eNB (evolved NodeB), an MME (mobility management entity), an HSS (home subscriber server), or an S-GW (serving gateway) in LTE/EPC (Long Term Evolution)/(evolved packet core), or an SGSN (serving GPRS support node), a GGSN (gateway GPRS support node), an MSC (mobile switching center), an NB (NodeB), or an RNC (radio network controller) in GSM (Global System for Mobile Communications) or UMTS (Universal Mobile Telecommunications System).

Interface information of the VNF network element may include one or a combination of the following: a specific interface name, a specific interface definition standard number, a specific interface code, specific bandwidth that an interface needs to occupy, a specific interface transmission medium requirement, a specific transmission protocol, or specific interface-related signaling (or a specific interface-related signaling list) that the V-OAM needs to support.

Function information of the VNF network element may include one or a combination of the following: information indicating that the VNF network element is configured to transmit voice or data, information indicating whether the VNF network element is used in a service processing procedure, or a number of a document for defining the function in a corresponding standard. A function description of each network element may be corresponding to a standard document, and the document has a number. For example, PM management in network management is corresponding to 3GPP TS32.522, and specifying the number means that a PM function needs to be processed according to an interface, a function, and an information element structure that are defined in the document.

Because the V-OAM is deployed to manage the VNF network element, the customized information of the V-OAM should be adapted to the attribute information of the VNF network element managed by the V-OAM. Specifically, the customized information of the V-OAM should be adapted to the attribute information of the VNF network element in aspects such as an interface, a function, and a network element type. That is, the V-OAM and the VNF network element can support a same interface protocol, management procedure, information element structure, and network element management scale, so that the V-OAM can communicate with the VNF network element managed by the V-OAM, and manage the VNF network element managed by the V-OAM.

For example, the customized information may be pre-stored in the VNF catalog, or stored in a separate catalog (for example, a V-OAM catalog), and the NFVO or the VNFM reads the VNF catalog or the V-OAM catalog to obtain the customized information.

The VNF catalog or the V-OAM catalog may be stored in the NFVO.

For example, the customized information may be specified by the operation and management system (NMS/OSS/BSS/BSS), and for example, may be dynamically specified by using an Os-Nfvo interface. The Os-Nfvo interface is an interface between the NMS/OSS/BSS and the NFVO.

For example, the customized information may include at least one of the following information: network management function configuration information, interface definition information, connection definition information, resource requirement definition information, virtualization manner information, or type information of the V-OAM.

The network management function configuration information of the V-OAM may be used for defining which functions the V-OAM should have, such as performance management, configuration management, alarm management, accounting management, security management and the like in current network management; whether the V-OAM can manage a plug-and-play device, whether the V-OAM can perform corresponding configuration on device self-organization, or whether the V-OAM supports a real-time function.

The interface definition information of the V-OAM may be used for defining requirements for the V-OAM and a managed object (for example, the VNF network element) on an interface type, an interface protocol, content transmitted by using an interface, a transmission medium used for the interface, and the like.

The connection definition information of the V-OAM may be used for defining a quantity of VNF network elements (one or more VNF network elements) to which the V-OAM can be connected.

Resource requirement information of the V-OAM may be a resource required for virtualization of the V-OAM, and generally includes a storage space requirement (for example, memory or hard disk space requirement), a CPU processing capability requirement, a processing core quantity, required bandwidth, a power supply requirement (for example, whether an uninterruptible power supply UPS is required), and an operating temperature requirement (for example, whether a fan is required for heat dissipation, or an air conditioner temperature).

The virtualization manner information of the V-OAM may mainly indicate whether virtualization of the V-OAM is performed together with virtualization of the VNF, or is performed separately.

The type information of the V-OAM may refer to a network standard of an object managed by the V-OAM (for example, whether the object managed by the V-OAM is a GSM network element or a UMTS or LTE network element), a network element type (for example, an MSC media gateway in a GSM standard, an MME mobility management entity in LTE, or a base station controller RNC in UMTS), or information about whether the V-OAM is multi-functional operation, administration and maintenance of a combination of some of the foregoing standards, or universal operation, administration and maintenance without consideration of a standard or a type of a specific network element.

It should be noted that specific content of the customized information may be properly set by a person skilled in the art according to an actual need, and the specific content of the customized information is not limited herein.

302. Deploy, according to the attribute information and the customized information, the V-OAM that is capable of managing the at least one type of VNF network element that needs to be deployed.

The NFVO or the VNFM may virtualize the V-OAM based on the customized information and according to an existing network element virtualization method, and the virtualized V-OAM needs to accord with the customized information.

For example, in deployment of the V-OAM, the NFVO or the VNFM needs to virtualize, according to a requirement of the customized information, virtual operation, administration and maintenance that manages a standard in the GSM/UMTS/LTE. The virtual operation, administration and maintenance may include a base station and a base station controller (belonging to an access network device). Assuming that required virtual resources are X1 CPUs (Central Processing Unit, central processing unit), an X2-megabyte memory, and an X3-GB (GigaByte, gigabyte) hard disk, corresponding resources are requested from a VIM, so as to virtualize the V-OAM.

Because of an interface requirement, when the NFVO requests a resource from the VIM, which types of transmission media and virtual connections meet the interface requirement need to be considered, and a corresponding protocol also needs to be loaded.

After the V-OAM is virtualized, a connection between the V-OAM and each VNF network element to be managed by the V-OAM may be established, and in this case, a ratio of the V-OAM to the VNF network elements needs to be controlled according to the previously obtained virtualization requirement. If the ratio of the V-OAM to the VNF network elements is not controlled according to the previously obtained virtualization requirement, the V-OAM may be overloaded and therefore cannot operate properly.

Optionally, the V-OAM may be deployed together with the VNF network element that needs to be deployed. Optionally, the VNF network element and the V-OAM may be deployed together in a same network entity.

Optionally, the VNF network element, the V-OAM, and the VNFM are deployed in a same network entity. The network entity may provide a standard interface for the outside, so as to help universal deployment of multi-manufacturer VNFs of an operator. An interface between the NFVO and the VNFM, that is, an Nfvo-Vnfm interface may be changed into a new self-organizing interface (which may be defined as Nfvo-VeEm or Nfvo-VnNf) between the VNF network element and the NFVO. The interface is mainly used to complete transmission of the following information: management information related to a conventional network management function of the V-OAM; management information in a VNF virtualization process; related information of a process in which the VNFM manages VNF virtualization; related information of a process in which the VNFM virtualizes the V-OAM; and runtime information in a VNF life cycle.

Optionally, the interface definition information of the V-OAM may be set as an open northbound interface of the V-OAM. The northbound interface of the V-OAM may include an interface (EMS-NMS interface) between the V-OAM and the NMS/OSS/BSS, and the interface may be used to transmit management information (FCAPS) related to an existing network management function and/or management information related to a virtualization process. The FCAPS includes: fault (alarm) information; configuration information; accounting information; performance information; and security control information. The management information related to the virtualization process includes any one or more of the following information: virtualization failure alarm information, resource insufficiency alarm information, resource security access event information, security key information, information about virtualization performance (a success rate, a delay, a failure rate, an effective resource utilization rate, or the like), virtual resource usage amount information, virtual resource charge information, or the like.

303. Manage a life cycle of the V-OAM according to the customized information.

In this embodiment, the management of the life cycle of the V-OAM may include a process that starts from creation of a V-OAM instance and ends at an end of the V-OAM instance and release of a resource, and may specifically include some or all of sub-processes such as loading a V-OAM program, instantiation, putting a service online, modifying a processing capacity, and ending an instance and releasing a resource.

Optionally, as shown in FIG. 3B, before step 301, the method may further include:

300. Determine whether a preset trigger condition is met, and if the preset trigger condition is met, perform step 301.

The trigger condition may include a quantity of VNF network elements that have been deployed on the virtualized network is greater than a pre-determined value (which may be set according to a need), or a VNF network element with a self-organizing function has been deployed on the virtualized network. Certainly, alternatively, a person skilled in the art may set the trigger condition to other proper content, and this is not specifically limited herein.

By means of the foregoing trigger mechanism, the NFVO or the VNFM may automatically trigger deployment of the V-OAM when the trigger condition is met.

In the method for deploying virtual operation, administration and maintenance provided in this embodiment, V-OAM is deployed for a VNF network element that the V-OAM needs to manage, and a management function and a management interface of the V-OAM may be customized according to a need and directly according to a type, an interface definition, and a function of the VNF, without a need that each V-OAM provides support for all interfaces and all types of network elements. Therefore, deployment costs are reduced.

Embodiment 3

Figure 4A:
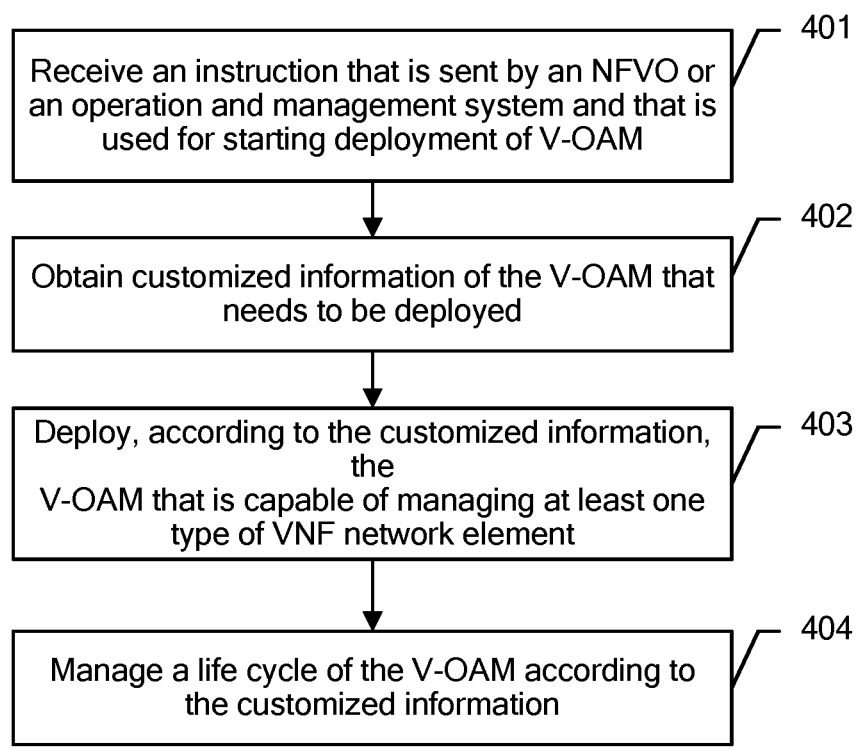
FIG. 4A is a first schematic flowchart of a method for deploying virtual operation, administration and maintenance according to Embodiment 3 of the present invention.
Figure 4B:
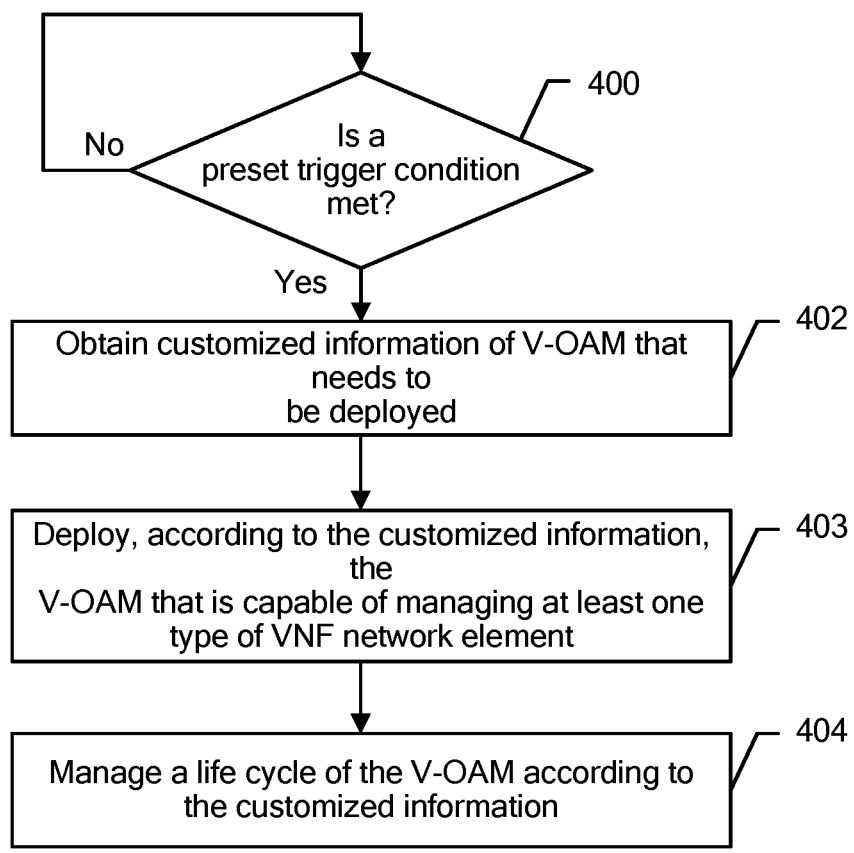
FIG. 4B is a second schematic flowchart of a method for deploying virtual operation, administration and maintenance according to Embodiment 3 of the present invention.

Referring to FIG. 4A and FIG. 4B, FIG. 4A and FIG. 4B are schematic flowcharts of a method for deploying virtual operation, administration and maintenance according to Embodiment 3 of the present invention. As shown in FIG. 4A, the method may include the following steps.

401. Receive an instruction that is sent by an NFVO or an operation and management system and that is used for starting deployment of V-OAM.

The deployment method in this embodiment is executed by a V-OAM manager (virtual operation, administration and maintenance manager), that is, the V-OAM is deployed by the V-OAM manager.

The NFVO and the V-OAM manager may be connected by using an Nfvo-VeEm interface, and may exchange a VNF virtualization operation result. The NFVO may send the instruction after completing deployment of at least one VNF network element or VNF instantiation, so that the V-OAM manager starts virtualization deployment of the V-OAM.

Related content about how the NFVO deploys the VNF network element pertains to the prior art, and is not described in detail herein.

402. Obtain customized information of the V-OAM that needs to be deployed.

The customized information may be used for defining an attribute of the virtual operation, administration and maintenance that needs to be deployed. Specific content of the customized information may be set by a user (for example, the operation and management system) according to a virtualization requirement for the virtual operation, administration and maintenance.

The customized information of the V-OAM that needs to be deployed may be adapted to attribute information of the VNF network element that the V-OAM needs to manage (including a VNF network element that has been deployed), so that the V-OAM can communicate with the VNF network element managed by the V-OAM, and manage the VNF network element managed by the V-OAM.

For example, the customized information may be stored in a VNF catalog, or stored in a separate catalog (for example, a V-OAM catalog), and the V-OAM manager reads the VNF catalog or the V-OAM catalog to obtain the customized information.

For example, the customized information may be specified by the operation and management system (NMS/OSS/BSS) by using an Os-Nfvo interface.

For example, the customized information includes at least one of the following information:

network management function configuration information, interface definition information, connection definition information, resource requirement definition information, virtualization manner information, or type information of the V-OAM.

403. Deploy the V-OAM according to the customized information.

The VNF network element that the V-OAM needs to manage may be one VNF network element, or multiple VNF network elements of different types, or multiple VNF network elements of a same type. This may be set in the customized information.

404. Manage a life cycle of the V-OAM according to the customized information.

In this embodiment, the management of the life cycle of the V-OAM includes a process that starts from creation of a V-OAM instance and ends at an end of the V-OAM instance and release of a resource, and may specifically include some or all of sub-processes such as loading a V-OAM program, instantiation, putting a service online, modifying a processing capacity, and ending an instance and releasing a resource.

Optionally, as shown in FIG. 4B, before step 402, the method may include:

400. Determine whether a preset trigger condition is met, and if the preset trigger condition is met, perform step 402, where the trigger condition may include: a quantity of VNF network elements that have been deployed on the virtualized network is greater than a pre-determined value (a specific value of the pre-determined value may be set by a user (for example, the operation and management system) according to a need in terms of management or another aspect), or a VNF network element with a self-organizing function has been deployed on the virtualized network.

By means of the foregoing trigger mechanism, the V-OAM manager may automatically trigger deployment of the V-OAM when the preset condition is met.

In the method for deploying virtual operation, administration and maintenance provided in this embodiment, V-OAM is deployed after deployment of a VNF network element is completed, and the V-OAM may be deployed as independent virtual operation, administration and maintenance without being limited by a type of the VNF network element, and can perform inter-VNF coordinated management or perform coordinated management on multiple VNF network elements.

Embodiment 4

Figure 5:
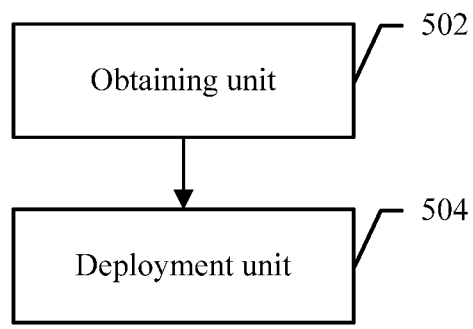
FIG. 5 is a first schematic diagram of a logical structure of an apparatus for deploying virtual operation, administration and maintenance according to Embodiment 4 of the present invention.

Referring to FIG. 5, FIG. 5 is a schematic structural diagram of an apparatus for deploying virtual operation, administration and maintenance according to Embodiment 4 of the present invention. As shown in FIG. 5, the apparatus for deploying virtual operation, administration and maintenance may include an obtaining unit 502 and a deployment unit 504.

The obtaining unit 502 is configured to obtain customized information of V-OAM that needs to be deployed.

The customized information may be used for defining an attribute of the virtual operation, administration and maintenance that needs to be deployed. Specific content of the customized information may be set by a user (for example, an operation and management system) according to a virtualization requirement for the virtual operation, administration and maintenance.

For example, the customized information may include:

network management function configuration information, interface definition information, connection definition information, resource requirement definition information, virtualization manner information, type information, and the like of the V-OAM.

The deployment unit 504 is configured to deploy, according to the customized information, the V-OAM that is capable of managing at least one type of VNF network element.

In the method for deploying virtual operation, administration and maintenance provided in this embodiment, V-OAM is deployed, so that different types of VNF network elements are managed by means of the V-OAM, thereby overcoming a disadvantage in the prior art.

Optionally, the apparatus for deploying virtual operation, administration and maintenance may further include a management unit (not shown in the figure), configured to manage a life cycle of the V-OAM according to the customized information.

Figure 6:
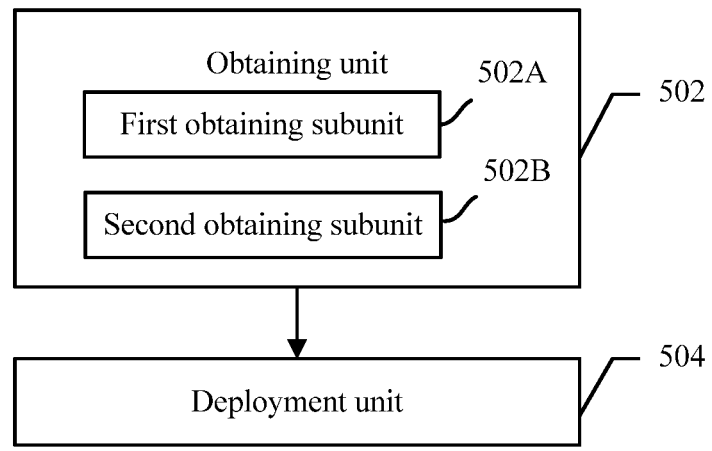
FIG. 6 is a second schematic diagram of a logical structure of an apparatus for deploying virtual operation, administration and maintenance according to Embodiment 4 of the present invention.

In an implementation manner shown in FIG. 6, the apparatus for deploying virtual operation, administration and maintenance is an NFVO or a VNFM.

As shown in FIG. 6, the obtaining unit 502 may include a first obtaining subunit 502A, configured to obtain attribute information of at least one type of VNF network element that needs to be deployed, and a second obtaining subunit 502B, configured to obtain the customized information of the V-OAM that needs to be deployed.

For example, the attribute information of the VNF network element may include attribute information such as a type, an interface, and a function of the VNF.

For example, the customized information of the V-OAM may include the network management function configuration information, the interface definition information, the connection definition information, the resource requirement definition information, the virtualization manner information, the type information, and the like of the V-OAM.

The customized information required by the V-OAM should be adapted to the attribute information of the VNF network element, so that the V-OAM can communicate with the VNF network element managed by the V-OAM, and manage the VNF network element managed by the V-OAM.

Accordingly, the deployment unit 504 may be specifically configured to deploy, according to the attribute information of the at least one type of VNF network element and the customized information of the V-OAM, the V-OAM that is capable of managing the at least one type of VNF network element that needs to be deployed.

Optionally, the V-OAM may be deployed together with the at least one type of VNF network element that needs to be deployed.

Optionally, the VNF network element and the V-OAM may be deployed together in a same network entity.

In the implementation manner shown in FIG. 6, the deployment apparatus may perform deployment for a VNF network element that V-OAM needs to manage, and a management function and a management interface of the V-OAM may be customized according to a need and directly according to a type, an interface definition, and a function of the VNF, without a need that each V-OAM provides support for all interfaces and all types of network elements. Therefore, deployment costs are reduced.

Figure 7:
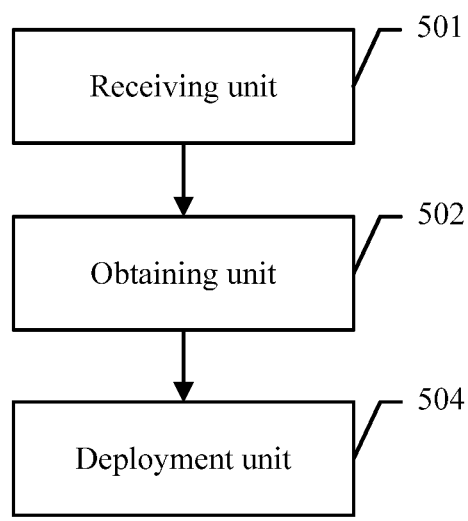
FIG. 7 is a third schematic diagram of a logical structure of an apparatus for deploying virtual operation, administration and maintenance according to Embodiment 4 of the present invention.

In an implementation manner shown in FIG. 7, the apparatus for deploying virtual operation, administration and maintenance may be a V-OAM manager.

As shown in FIG. 7, the apparatus for deploying virtual operation, administration and maintenance may further include a receiving unit 501, configured to receive an instruction that is sent by the NFVO and that is used for starting deployment of the V-OAM.

The V-OAM manager and the NFVO may be connected by using an Nfvo-VeEm interface, and may exchange a VNF virtualization operation result. After completing deployment of the VNF network element or VNF instantiation, the NFVO instructs the V-OAM manager to start virtualization of the V-OAM.

Accordingly, the obtaining unit 502 may be configured to: obtain, from the NFVO, the customized information of the V-OAM that needs to be deployed, or receive the customized information that is (dynamically) specified by the operation and management system.

The deployment unit 504 is specifically configured to deploy the V-OAM according to the customized information.

According to the apparatus for deploying virtual operation, administration and maintenance provided in the implementation manner shown in FIG. 7, V-OAM may be deployed after deployment of a VNF network element is completed, and the V-OAM may be deployed as independent virtual operation, administration and maintenance without being limited by a type of the VNF network element, and can perform inter-VNF coordinated management or perform coordinated management on multiple VNF network elements.

Optionally, the deployment apparatus may further include a determining unit, configured to determine whether a preset trigger condition is met, and a triggering unit, configured to trigger deployment of the V-OAM when a determining result of the determining unit is that the trigger condition is met.

The trigger condition may include: a quantity of VNF network elements that have been deployed on the virtualized network is greater than a pre-determined value (which may be set according to a need), or a VNF network element with a self-organizing function has been deployed on the virtualized network. Certainly, alternatively, a person skilled in the art may set the trigger condition to other proper content, and this is not specifically limited herein.

By means of the foregoing trigger mechanism, the NFVO or the VNFM or the V-OAM manager can automatically trigger deployment of the V-OAM when the preset condition is met.

Embodiment 5

Figure 8:
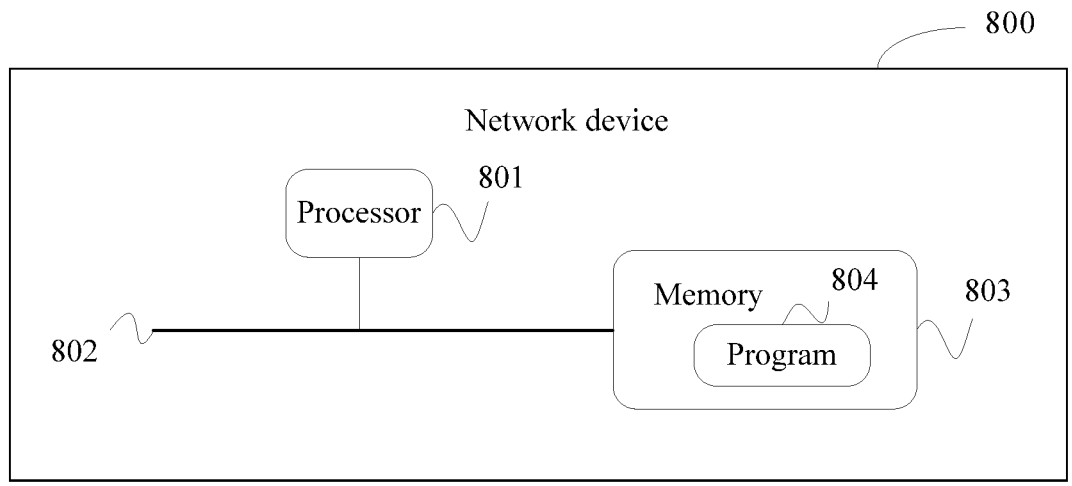
FIG. 8 is a schematic diagram of a logical structure of an apparatus for deploying virtual operation, administration and maintenance according to Embodiment 5 of the present invention.

This embodiment of the present invention further provides an apparatus 800 for deploying virtual operation, administration and maintenance, and as shown in FIG. 8, the deployment apparatus 800 may include a processor 801 and a memory 803 that are connected to a bus 802.

The memory 803 may be configured to store an execution instruction. Specifically, the memory 803 may store a program 804. The program 804 may include program code, and the program code includes the execution instruction.

For example, the memory 803 may include a high-speed RAM, and may also include a non-volatile memory (non-volatile memory), for example, at least one disk memory.

The processor 801 may be configured to communicate with the memory 803, and execute the execution instruction to enable the network device 800 to execute the method including obtaining customized information of V-OAM that needs to be deployed, where the customized information is used for defining an attribute of the V-OAM that needs to be deployed, and deploying, according to the customized information, the V-OAM that is capable of managing at least one type of VNF network element.

Optionally, the obtaining customized information of virtual operation, administration and maintenance V-OAM that needs to be deployed includes reading a VNF catalog or a V-OAM catalog that is stored in an NFVO, to obtain the customized information, or receiving the customized information specified by an operation and management system.

Optionally, the customized information includes at least one of the following information network management function configuration information, interface definition information, connection definition information, resource requirement definition information, virtualization manner information, or type information of the V-OAM.

Optionally, before the V-OAM is deployed on a virtualized network according to the customized information, the method further includes obtaining attribute information of the at least one type of VNF network element that needs to be deployed.

That the V-OAM is deployed on the virtualized network according to the customized information includes deploying, on the virtualized network according to the attribute information and the customized information, the V-OAM that is capable of managing the at least one type of VNF network element that needs to be deployed.

Optionally, before the obtaining customized information of virtual operation, administration and maintenance V-OAM that needs to be deployed, the method further includes receiving an instruction that is sent by the NFVO or the operation and management system and that is used for starting deployment of the V-OAM.

Optionally, before the obtaining customized information of virtual operation, administration and maintenance V-OAM that needs to be deployed, the method further includes determining whether a preset trigger condition is met, and if the preset trigger condition is met, starting the deployment of the V-OAM.

Optionally, the method further includes managing a life cycle of the V-OAM according to the customized information.

In addition, this embodiment of the present invention further provides a computer-readable medium that includes a computer-executable instruction. The computer-executable instruction can enable the apparatus 800 for deploying virtual operation, administration and maintenance to execute the method described in the embodiments of the present invention. An implementation principle and a technical effect of the computer-readable medium and the computer-executable instruction are similar to those of the foregoing embodiments, and are not described in detail herein.

Embodiment 6

Figure 9:
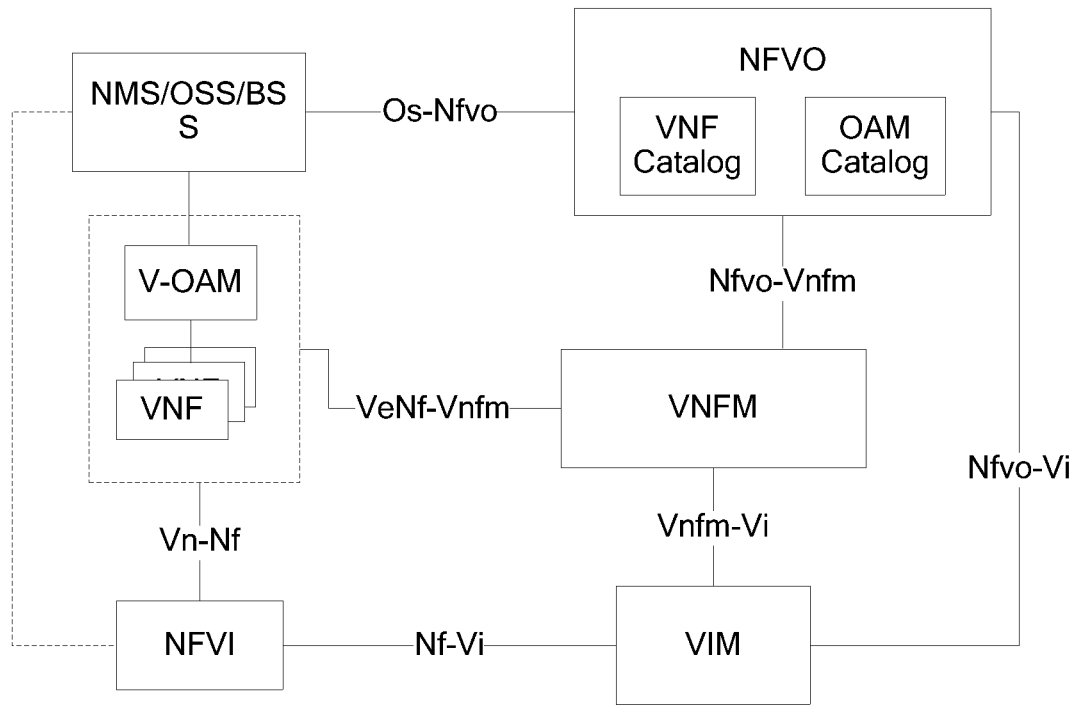
FIG. 9 is a schematic diagram of a logical structure of a virtualized network system according to Embodiment 6 or 7 of the present invention.

This embodiment of the present invention further provides a network system, and specific connection relationships among components in the network system are shown in FIG. 9.

The network system includes an NFVO. The NFVO may be configured to obtain customized information of V-OAM that needs to be deployed, and deploy the V-OAM according to the customized information.

The customized information may be used for defining an attribute of the virtual operation, administration and maintenance that needs to be deployed. Specific content of the customized information may be set by a user (for example, an operation and management system) according to a virtualization requirement for the virtual operation, administration and maintenance. For example, the customized information may include at least one of the following information network management function configuration information, interface definition information, connection definition information, resource requirement definition information, virtualization manner information, or type information of the V-OAM.

Further, the NFVO may be further configured to obtain attribute information of at least one type of VNF network element that needs to be deployed, and deploy, according to the attribute information and the customized information, the V-OAM that is capable of managing the at least one type of VNF network element that needs to be deployed.

The VNF network element that needs to be deployed may be one or more VNF network elements. The attribute information of the VNF network element may be preset by the user (for example, the operation and management system), and may be stored in a VNF catalog.

The attribute information of the VNF network element may include attribute information such as a type, an interface, and a function of the VNF. The customized information required by the V-OAM should be adapted to the attribute information of the VNF network element.

For example, the customized information may be prestored in the VNF catalog, or stored in a separate catalog (for example, a V-OAM catalog), and the NFVO reads the VNF catalog or the V-OAM catalog to obtain the customized information.

The VNF catalog or the V-OAM catalog may be stored in the NFVO.

For example, the customized information may be specified by the operation and management system (NMS/OSS/BSS), and for example, may be dynamically specified by using an Os-Nfvo interface. The Os-Nfvo interface is an interface between the NMS/OSS/BSS and the NFVO.

Optionally, as shown in FIG. 9, the VNF network element and the V-OAM may be deployed together in a same network entity.

Further, the NFVO may be further configured to manage a life cycle of the V-OAM according to the customized information.

It should be noted that the virtualized network system may further include network elements such as a VNFM, a VIM and an NFVI, but these network elements are not a focus of descriptions in the present invention, and therefore are not described in detail herein.

Embodiment 7

This embodiment of the present invention further provides a network system, and specific connection relationships among components in the network system are shown in FIG. 9.

The network system includes a VNFM. The VNFM may be configured to obtain customized information of V-OAM that needs to be deployed, and deploy the V-OAM according to the customized information.

The customized information may be used for defining an attribute of the virtual operation, administration and maintenance that needs to be deployed. Specific content of the customized information may be set by a user (for example, an operation and management system) according to a virtualization requirement for the virtual operation, administration and maintenance. For example, the customized information may include at least one of the following information: network management function configuration information, interface definition information, connection definition information, resource requirement definition information, virtualization manner information, or type information of the V-OAM.

Further, the VNFM may be further configured to obtain attribute information of a VNF network element that needs to be deployed, and deploy, according to the attribute information and the customized information, the V-OAM that is capable of managing the VNF network element that needs to be deployed.

The VNF network element that needs to be deployed may be one or more VNF network elements. The attribute information of the VNF network element may be preset by the user (for example, the operation and management system), and may be stored in a VNF catalog.

The attribute information of the VNF network element may include attribute information such as a type, an interface, and a function of the VNF. The customized information required by the V-OAM should be adapted to the attribute information of the VNF network element.

For example, the customized information may be pre-stored in the VNF catalog, or stored in a separate catalog (for example, a V-OAM catalog), and the VNFM reads the VNF catalog or the V-OAM catalog to obtain the customized information.

The network system may further include an NFVO, and the VNF catalog or the V-OAM catalog may be stored in the NFVO.

For example, the customized information may be dynamically specified by the operation and management system (NMS/OSS/BSS) by using an Os-Nfvo interface, and the Os-Nfvo interface is an interface between the NMS/OSS/BSS and the NFVO.

Optionally, as shown in FIG. 9, the VNF network element and the V-OAM may be deployed together in a same network entity.

Further, the VNFM may be further configured to manage a life cycle of the V-OAM according to the customized information.

It should be noted that the virtualized network system may further include network elements such as a VIM and an NFVI, but these network elements are not a focus of descriptions in the present invention, and therefore are not described in detail herein.

Embodiment 8

Figure 10:
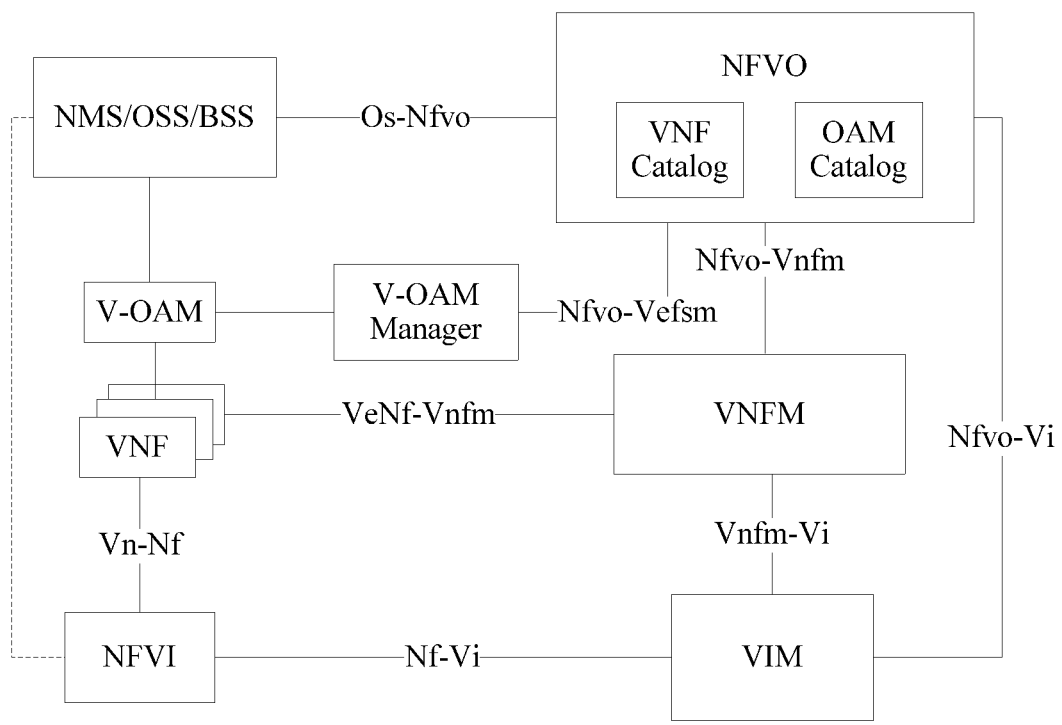
FIG. 10 is a schematic diagram of a logical structure of a virtualized network system according to Embodiment 8 of the present invention.

This embodiment of the present invention further provides a virtualized network system, connection relationships among components in the virtualized network system are shown in FIG. 10, and the virtualized network system may include a V-OAM manager.

The V-OAM manager may be configured to obtain customized information of V-OAM that needs to be deployed, and deploy the V-OAM according to the customized information.

Optionally, before obtaining the customized information of the V-OAM that needs to be deployed, the V-OAM manager is further configured to receive an instruction that is sent by an NFVO and that is used for starting deployment of the V-OAM, and start the deployment of the V-OAM according to the instruction.

Optionally, after completing the deployment of the V-OAM, the V-OAM manager may further manage a life cycle of the V-OAM according to the customized information.

It should be noted that the virtualized network system may further include network elements such as an NFVO, a VNFM, a VIM, and an NFVI, but these network elements are not a focus of descriptions in the present invention, and therefore are not described in detail herein. It should be noted that the foregoing embodiments are based on a same inventive concept, descriptions in the embodiments have respective emphasis, and for a part without being described in detail in an embodiment, reference may be made descriptions in other embodiments.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The method and apparatus for deploying virtual operation, administration and maintenance, and the virtualized network system provided in the embodiments of the present invention are described above in detail. In this specification, specific examples are used to describe the principle and implementation manners of the present invention, and the description of the embodiments is only intended to help understand the method and core idea of the present invention. In addition, a person of ordinary skill in the art may make modifications to the specific implementation manners and the application scope based on the idea of the present invention. Therefore, the content of this specification shall not be construed as a limitation to the present invention.

What is claimed is:

1. A method for deploying virtual operation, administration and maintenance, comprising:
    obtaining customized information of virtual operation, administration and maintenance (V-OAM) that needs to be deployed for managing a virtual network function (VNF), wherein the VNF provides virtualization, using a virtual resource provided by a network functions virtualization infrastructure (NFVI), for a type of network element that needs to be deployed for a network, wherein the customized information defines an attribute of the V-OAM, and wherein the V-OAM is configured to dynamically adjust a virtualization scale, type and interface of the V-OAM according to a virtualization process and status of the VNF so that the V-OAM adapts to attribute information of the VNF and the V-OAM communicates with, and manages, the VNF using an interface of the VNF specified by the VNF attribute information; and
    deploying, on a virtualized network according to the customized information, the V-OAM that is capable of managing at least one type VNF network element.

2. The method according to claim 1, wherein the obtaining the customized information of the V-OAM that needs to be deployed comprises performing at least one of:
    reading a virtualized network function catalog (VNF catalog) or a virtual operation, administration and maintenance catalog (V-OAM catalog), to obtain the at least one of the VNF catalog or the V-OAM catalog from a network functions virtualization orchestrator (NFVO); or
    receiving the customized information specified by an operation and management system.

3. The method according to claim 1, wherein the customized information comprises at least one of network management function configuration information, interface definition information, connection definition information, resource requirement definition information, virtualization manner information, or type information of the V-OAM.

4. The method according to claim 1, wherein the method further comprises obtaining, before the deploying the V-OAM, attribute information of at least one type of VNF network element that needs to be deployed; and
    wherein the deploying the V-OAM comprises deploying, on the virtualized network according to the attribute information and the customized information, the V-OAM that is capable of managing the at least one type of VNF network element that needs to be deployed.

5. The method according to claim 1, wherein the method further comprises performing, before the obtaining the customized information of the V-OAM that needs to be deployed:
    determining whether a preset trigger condition is met; and triggering deployment of the V-OAM in response to the preset trigger condition being met; and wherein the trigger condition comprises at least one of a quantity of VNF network elements that have been deployed on the virtualized network is greater than a pre-determined value, or a VNF network element with a self-organizing function has been deployed on the virtualized network.

6. The method according to claim 1, wherein the method further comprises receiving, before the obtaining the customized information of the V-OAM that needs to be deployed, an instruction that is sent by network functions virtualization orchestrator (NFVO) or the operation and management system and that is used for starting deployment of the V-OAM.

7. The method according to claim 1, wherein the method further comprises managing a life cycle of the V-OAM according to the customized information.

8. The method according to claim 1, wherein the customized information of the V-OAM comprises attribute information describing at least function information of the VNF network element, wherein the function information of the VNF network is information indicating at least one of which of voice of data the VNF network is configured to transmit, whether the VNF network element is used in a service processing procedure, or a number of a document defining the function in a corresponding standard.

9. An apparatus for deploying virtual operation, administration and maintenance, wherein the apparatus comprises:
a processor; and
a non-transitory computer-readable storage medium storing a program to be executed by the processor, the program including instructions for:
obtaining customized information of virtual operation, administration and maintenance (V-OAM) that needs to be deployed for managing a virtual network function (VNF), wherein the VNF provides virtualization, using a virtual resource provided by a network functions virtualization infrastructure (NFVI), for a type of network element that needs to be deployed for a network, and wherein the customized information defines an attribute of the V-OAM, and wherein the V-OAM is configured to dynamically adjust a virtualization scale, type and interface of the V-OAM according to a virtualization process and status of the VNF so that the V-OAM adapts to attribute information of the VNF and the V-OAM communicates with, and manages, the VNF using an interface of the VNF specified by the VNF attribute information; and
deploying, on a virtualized network according to the customized information, the V-OAM that is capable of managing at least one type of a VNF network element.

10. The apparatus according to claim 9, wherein the instructions for obtaining customized information of V-OAM that needs to be deployed comprise instructions for performing at least one of reading at least one of a VNF catalog or a V-OAM catalog, to obtain the customized information, wherein the at least one of VNF catalog or the V-OAM catalog is stored in a network functions virtualization orchestrator (NFVO), or
receiving the customized information specified by an operation and management system.

11. The apparatus according to claim 9, wherein the customized information comprises at least one of network management function configuration information, interface definition information, connection definition information, resource requirement definition information, virtualization manner information, or type information of the V-OAM.

12. The apparatus according to claim 9, wherein the program further includes instructions for obtaining attribute information of at least one type of VNF network element that needs to be deployed; and
wherein the instructions for deploying the V-OAM includes instructions for deploying, according to the attribute information and the customized information, the V-OAM that is capable of managing the at least one type of VNF network element that needs to be deployed.

13. The apparatus according to claim 9, wherein the program further includes instructions for:
determining whether a preset trigger condition is met; and
triggering deployment of the V-OAM in response to determining that the preset trigger condition is met, wherein the preset trigger condition comprises at least one of a quantity of VNF network elements that have been deployed on the virtualized network is greater than a pre-determined value, or a VNF network element with a self-organizing function has been deployed on the virtualized network.

14. The apparatus according to claim 9, wherein the program further includes instructions for receiving an instruction that is sent by at least one of a network functions virtualization orchestrator (NFVO) or the operation and management system and that is used for starting deployment of the V-OAM.

15. The apparatus according to claim 9, wherein the program further includes instructions for managing a life cycle of the V-OAM according to the customized information.

16. The apparatus according to claim 9, wherein the customized information of the V-OAM comprises attribute information describing at least function information of the VNF network element, wherein the function information of the VNF network is information indicating at least one of which of voice of data the VNF network is configured to transmit, whether the VNF network element is used in a service processing procedure, or a number of a document defining the function in a corresponding standard.

17. A virtualized network system, comprising:
an apparatus that is one of a network functions virtualization orchestrator (NFVO), a virtualized network function manager (VNFM), or a virtual operation, administration and maintenance (V-OAM) manager;
wherein the apparatus is configured to obtain customized information of V-OAM that needs to be deployed for managing a virtual network function (VNF), wherein the VNF provides virtualization, using a virtual resource provided by a network functions virtualization infrastructure (NFVI), for a type of network element that needs to be deployed for a network, and wherein the V-OAM is configured to dynamically adjust a virtualization scale, type and interface of the V-OAM according to a virtualization process and status of the VNF so that the V-OAM adapts to attribute information of the VNF and the V-OAM communicates with, and manages the VNF using an interface of the VNF specified by the VNF attribute information;
wherein the customized information defines an attribute of the V-OAM; and
wherein the apparatus is further configured to deploy, on a virtualized network according to the customized information, the V-OAM that is capable of managing at least one type of VNF network element.

18. The system according to claim 17, wherein the apparatus is configured to obtain the customized information of the V-OAM that needs to be deployed by performing at least one of:
reading a virtualized network function catalog (VNF catalog) or a virtual operation, administration and maintenance catalog (V-OAM catalog), to obtain the at least one of the VNF catalog or the V-OAM catalog from a network functions virtualization orchestrator (NFVO); or
receiving the customized information specified by an operation and management system.

19. The system according to claim 17, wherein the customized information comprises at least one of network management function configuration information, interface definition information, connection definition information, resource requirement definition information, virtualization manner information, or type information of the V-OAM.

20. The apparatus according to claim 17, wherein the customized information of the V-OAM comprises attribute information describing at least function information of the VNF network element, wherein the function information of the VNF network is information indicating at least one of which of voice of data the VNF network is configured to transmit, whether the VNF network element is used in a service processing procedure, or a number of a document defining the function in a corresponding standard.

* * * * *